United States Patent [19]
Tabaroni et al.

[11] Patent Number: 5,789,005
[45] Date of Patent: Aug. 4, 1998

[54] METHOD OF PACKAGING AN EDIBLE PRODUCT AND A RELATED CONFECTION UNIT

[75] Inventors: Roberto Tabaroni, Bologna; Andrea Bartoli, Reggio Emilie, both of Italy

[73] Assignee: Unifill S.P.A., Secchia, Italy

[21] Appl. No.: 592,336

[22] PCT Filed: Jul. 27, 1994

[86] PCT No.: PCT/EP94/02493

§ 371 Date: May 31, 1996

§ 102(e) Date: May 31, 1996

[87] PCT Pub. No.: WO95/05749

PCT Pub. Date: Mar. 2, 1995

[30] Foreign Application Priority Data

Aug. 26, 1993 [IT] Italy ................ MO93A0108

[51] Int. Cl.$^6$ .................................. A23G 7/00
[52] U.S. Cl. ................ 426/104; 426/110; 426/134; 426/414; 426/514
[58] Field of Search ............... 426/104, 110, 426/134, 414, 515, 514, 565; 53/467

[56] References Cited

U.S. PATENT DOCUMENTS

| | | | |
|---|---|---|---|
| 2,578,361 | 12/1951 | Kappel | 426/515 |
| 2,728,677 | 12/1955 | Colman | 426/110 |
| 2,759,831 | 8/1956 | Young et al. | 426/110 |
| 2,766,123 | 10/1956 | Moubayed | 426/134 |
| 4,001,440 | 1/1977 | Hoyt | 426/110 |
| 4,229,482 | 10/1980 | Kreske | 426/134 |
| 5,374,436 | 12/1994 | White et al. | 426/515 |

FOREIGN PATENT DOCUMENTS

| | | | |
|---|---|---|---|
| 395756 | 11/1990 | European Pat. Off. | |
| 4-16147 | 1/1992 | Japan | 426/134 |
| 533502 | 1/1946 | United Kingdom | |
| WO93/21087 | 10/1993 | WIPO | |

OTHER PUBLICATIONS

Abstract of Publication No. JP4059229, Published in Feb. 1992 in vol. 16, No. 250 of Japanese Patent Office.

*Primary Examiner*—Joseph W. Drodge
*Attorney, Agent, or Firm*—Reising, Ethington, Learman & McCulloch

[57] ABSTRACT

A method of packaging an edible product, which significantly simplifies the manufacturing procedure, includes the introduction of an insert (8) into the base of a cavity (4) of a disposable package (2), which also serves as a mold, before pouring-in the product in a liquid form. The package (2) consists of a pair of shells (2) with opposing concavities, heat sealed along their edges (3). The method is applicable in the food industry, particularly in the manufacture of sweets.

20 Claims, 3 Drawing Sheets

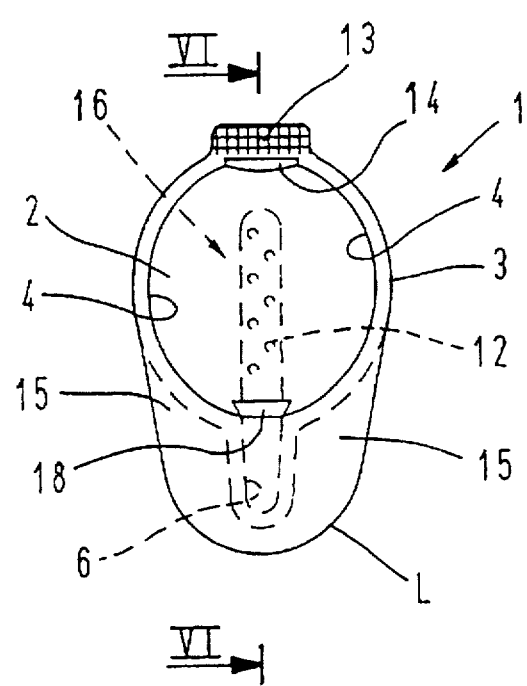
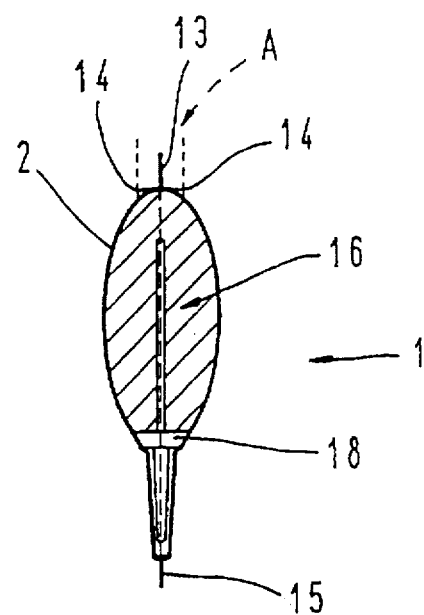
Fig. 5          Fig. 6
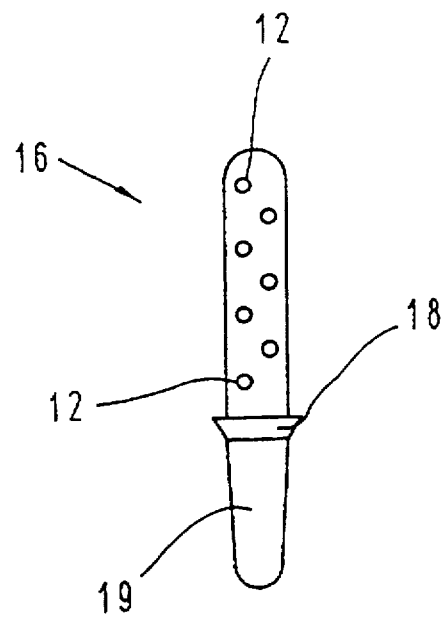
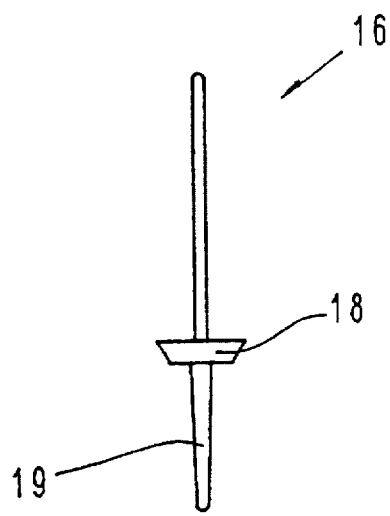
Fig. 7          Fig. 8

METHOD OF PACKAGING AN EDIBLE PRODUCT AND A RELATED CONFECTION UNIT

The invention concerns a method of packaging an edible product and a related confection unit.

The method is usable to impart desired shapes to food products such as ice-cream, iced-drink, sweets, cheeses, by means of pouring, or injecting, a syrup, or a fluid mixture in general, into a mould, with its subsequent solidification.

The prior art includes methods of moulding edible products that comprise pouring a mixture, be it a syrup, liquid or paste, into a mould with its subsequent solidification by refrigeration; as the finished products have to contain an insert, in the form of a stick, to enable the product to be held while being consumed, as is the case, for example, with ice-creams or ice-lollies, the insert is positioned in the mould, generally during or after pouring of the mixture and always before its final solidification; it is to be noted that positioning the insert is not easy, in particular as it requires complex mechanisms to suspend the insert in the cavity of each mould.

Furthermore, the portion of the insert that protrudes from the product often becomes covered by some of the liquid or syrup mixture during pouring: this causes an unpleasant and unhygienic contact of the product with the hand while being consumed.

Finally, with such prior art moulding methods, the products have to be removed from the mould once they have solidified so that they may be packaged; this involves the risk of worsened hygiene conditions, increased costs and complexity of the production plant.

U.S. Pat. No. 2,759,831 discloses a confection unit, in the form of a sealed package in which the confection material is contained as a liquid to be frozen at a time substantially beyond that at which the unit is produced and which further contains a stick-form supporting handle which, when frozen into the confection, supports the same. The confection unit encloses a confection liquid such as a dilute aqueous fruit syrup solution in a plastics tube with downward strip-form extensions heat-sealed together about three edges, the tube being sealed at both ends. The handle was present between the strip-form extensions at the time when they were heat-sealed together and is closely encased by them.

Manufacture of this kind of confection unit is difficult because the lower edge of the plastic tube must be sealed around the stick, which implies high accuracy in positioning the stick in order to avoid interference between the stick and the sealing means, e. g. hot bar sealers.

Also, with a tubular packaging film, the space available for the mechanism for positioning the stick is limited by the diameter of the tube.

Moreover, such a confection unit is difficult to open when the consumer wishes to consume the product, because the packaging must be torn open and subsequently slipped down around the frozen product for access thereto and progressively drawn down as the frozen product is gradually consumed, or removed completely as it is torn open.

An object of the present invention is to provide a method of packaging edible products that is simpler and more efficient, in particular in relation to the positioning and centering of the insert.

A further object of the present invention is to provide a confection unit which is easier to open.

According to one aspect of the present invention, there is provided a method of packaging an edible product, comprising:

forming a confection package comprising a pouch-like portion and a tubular portion whereof the interior communicates with the interior of the pouch-like portion, with a handle extending along the tubular portion and thence into the pouch-like portion, filling the pouch-like portion with an edible fluid through an opening of said confection package;

and sealing said opening;

wherein the handle is inserted in said tubular portion after the forming of said tubular portion and before said filling.

Opening means is preferably formed in the confection package when forming said pouch-like portion and said tubular portion.

The confection package can act as a disposable mould for the product, i. e. be made of the same material used for the wrapping, and can be manufactured using a moulding technology that involves blow-moulding of a pair of sheets of thermoformable material, such as a plastics, or composite sheets of plastics and aluminium, according to the following steps:

heat sealing a pair of sheets along a contour that defines the final outline of the product, including the external portion of the handle, and shaping the confection package in a die by injection of compressed air through a non-sealed opening in the said contour.

In the alternative, said pair of sheets can be shaped by pressing, or drawing, or any equivalent plastic deformation process, and subsequently sealed along an edge defining the outline of the product.

It is to be noted that said handle may be of the same material as that of the confection package: this may be achieved, to obtain environmental benefits and production savings, by using the off-cuts produced when the confection package, after forming, is separated from the sheet material.

Thus, a pair of opposing shells is obtained that defines a moulding cavity into which the handle is introduced first, in a tubular passageway so as to form a liquid-tight seal in contact with the handle itself, then the liquid mixture is injected, or simply poured, through the opening left by the air injection; after filling, the opening is heat sealed to close the confection package before the product is solidified.

According to another aspect of the present invention, there is provided a confection unit comprising a confection package comprised of a puch-like portion and a tubular portion whereof the interior communicates with the interior of the pouch-like portion, with a handle extending along the tubular portion and thence into the pouch-like portion, an edible product in said pouch-like portion, said pouch-like portion having upper sealing at its upper end, and said tubular portion being bounded by lower sealing wherein said pouch-like portion and said tubular portion are constituted by a pair of opposing shells, said upper sealing and said lower sealing being part of substantially continuous sealing around the edge of the pouch-like portion and the tubular portion.

Said substantially continuous sealing is preferably associated with opening means included in one or each shell to allow separation along the substantially continuous sealing.

Said substantially continuous sealing preferably interconnects said shells in such a way that the shells, can be simply disconnected by the consumer acting on the opening means to move one shell away from the other to give access to the product.

This is easily achieved if the sheet material used for one or each shell is a peelable material.

In a preferred embodiment, said handle is tubular, open at its outer end and communicates with the product at its inner end.

This allows the consumer to consume the product contained in the confection unit in a liquid form, once the confection package is only partially opened.

In this embodiment, the handle may be used substantially as a straw.

The advantages offered by the invention are: simplicity and functionality; good hygiene standards; the solidified product may be easily removable from the mould-package by separating shells that make up the mould by rupturing the heat seal around its edge.

Further advantages and features of the invention will be understood from the detailed description of some embodiments of the invention illustrated, merely by way of example, in the drawings attached, in which:

FIG. 5 is a view similar to FIG. 1, of an embodiment having a flat handle fitted with a seal ring in the shape of a truncated cone;

FIG. 6 is a section taken on the line VI—VI of FIG. 5;

FIGS. 7 and 8 are, respectively, front and side views of the handle of FIG. 6;

FIGS. 1 to 4 show the confection unit 1, i. e. the product in its package 2, which functions also as a mould, made up of two opposed shells, for example symmetrically opposed shells, of whatever shape, preferably made of plastics.

Figure 1:
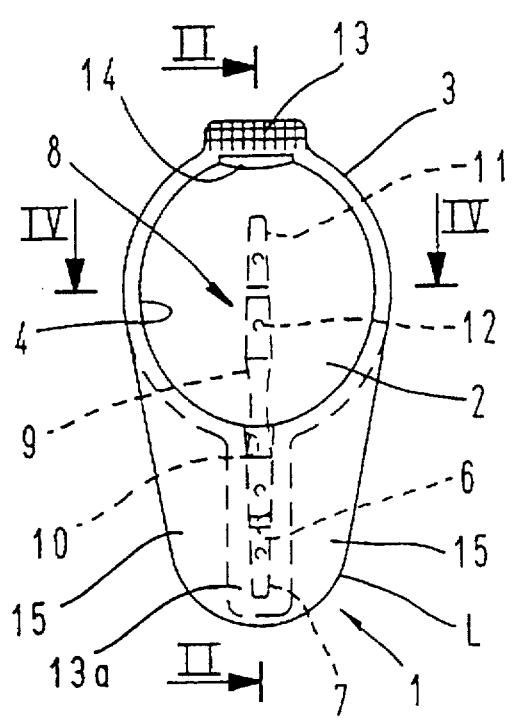
FIG. 1 is a front view of a confection unit.
Figure 2:
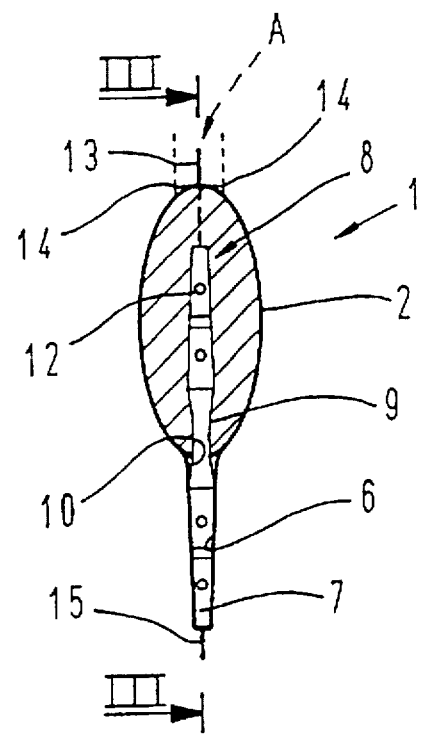
FIG. 2 is a section taken on the line II—II of FIG. 1 showing in dashed line an opening used to blow-mould and/or fill the confection package.
Figure 3:
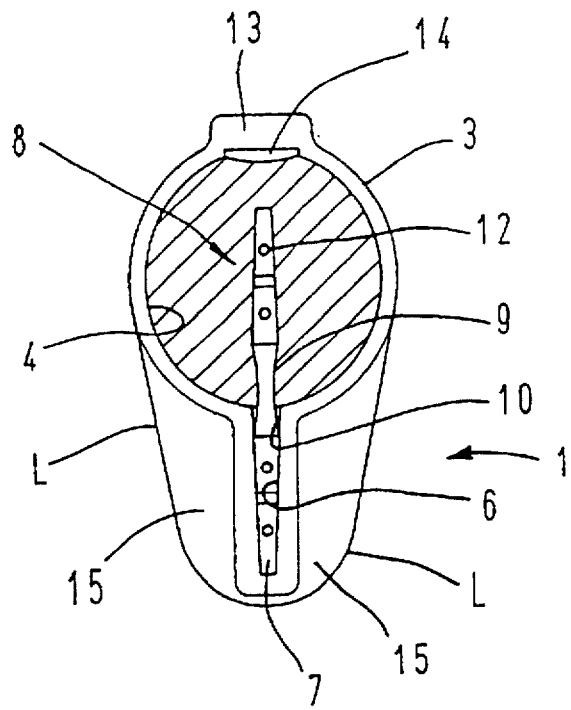
FIG. 3 is a section taken on the line III—III of FIG. 2.

The opposed shells are joined together by a continuous sealing 3, preferably a heat sealing, along part of their outside edge, for example in the longitudinal median plane of the confection package 2.

The shells define an internal cavity 4, large enough to contain the fluid product, extending downwards as a downwardly tapering tubular passageway, for example a recess 6, which functions as a holder for the handle 8, for example a stick. The tubular portion defining the recess seals the outer half 7 of the handle 8 in order to prevent liquid product from coming into contact with the outer half 7.

The outer half 7 is preferably tapered, preferably conically, to enable its insertion into the recess 6 so as to create a liquid-tight seal.

The tubular recess 6 acts also as centering for the handle 8 when filling the internal cavity 4 with the fluid product.

The handle 8 is preferably provided with a central groove 9 in order to avoid interference with the internal part 10 of the sealing 3 at the junction between the pouch-like upper portion of the package and the tubular lower portion, the groove 9 acting also as an anchoring means for the product after solidification.

The inner half 11 of the handle 8 can be of any form, though, for ease of insertion, it is preferably made symmetrical with the lower half 7; the inner half 11 being preferably provided with indentations 12, for example through holes, to receive portions of the product to improve binding with the product during solidifying; providing indentations in the outer half of the handle 8 further allows easy handling of the product when extracted from the confection package.

In a section of the continuous sealing 3 on the opposite side from the recess 6, an upper section 13 of continuous seal 3 is provided, for example flat, the upper section 13 being sealed, after the fluid product has been introduced into the cavity 4 through the opening A, to seal the confection package 2.

The continuous sealing 3 has a lower section 13a encompassing the recess 6.

The part of the confection package 2 immediately beneath the upper section 13 of the continuous seal 3 has bulges 14 resulting from the final sealing of the package.

The pair of sheets that make up the shells of the confection package 2 extend outwards to form opening means by which the shells can be separated by the consumer to give access to the edible product. The opening means are preferably a pair of opposing flaps 15 that are not sealed to each other and are each integral with a corresponding shell of the confection unit 2, and are preferably outside the continuous sealing 3.

Advantageously, the flaps are bounded by respective lines L tangential to the outline of the pouch-like portion of the confection unit 2 and converging towards the outer end of the recess 6, in order to retain the compactness of the confection unit 1.

However, it is to be understood that opening means, preferably in the form of flaps, may be provided at any section of the continuous sealing 3.

Line L and/or the profile of the continuous sealing 3 and/or the shape of the shells and/or the shape of the opening means may be designed to give the confection package 2 a pleasing appearance.

Figure 11:
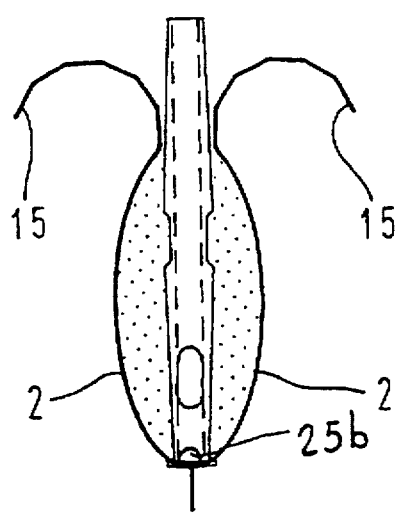
FIG. 11 is a view similar to FIG. 10, showing the confection package in a partially opened configuration.
Figure 12:
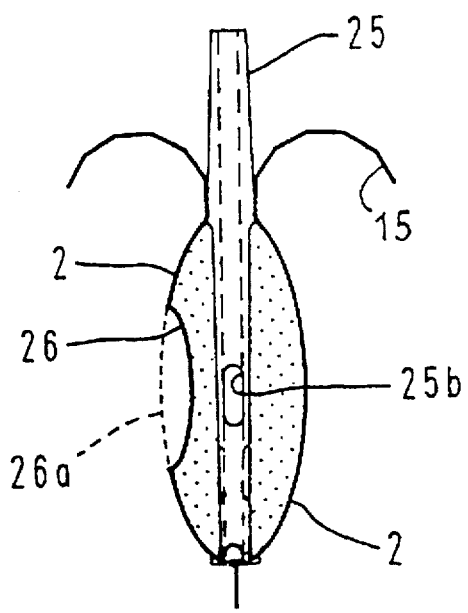
FIG. 12 is a view siliar to FIG. 11, showing a confection unit according to a preferred embodiment having a depression in one of the shells.

In order to allow only partial separation of the shells, as shown in FIGS. 11 and 12, the flaps 15 are preferably provided with lines of weakness 15a, preferably grooves, advantageously obtained by plastic deformation, e. g. pressing, when forming the pair of shells defining the confection package 2.

According to FIGS. 5 to 8, the handle may comprise a flat elongated stick 16, having a seal ring 18 in its intermediate portion whose external surface is tapered downwards, preferably in the shape of a truncated cone. That surface makes sealing contact with the internal surface of the pouch-like portion adjacent at the opening of the recess 6; the outer part 19 of the stick 16 having tapering sides to facilitate its insertion in the recess 6.

As shown in FIGS. 9 to 12, the handle may be a tubular member 25, having an internal passage 25a extending between the outer end and the inner end of the handle and can be used as a straw for drinking the product when liquid.

Figure 4:
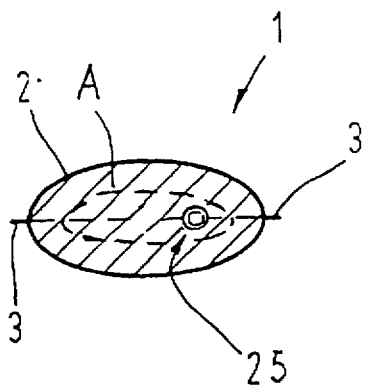
FIG. 4 is a section taken on the line IV—IV of FIG. 1, according to a preferred embodiment in which a handle is off-center with respect to the longitudinal axis of the confection unit.
Figure 9:
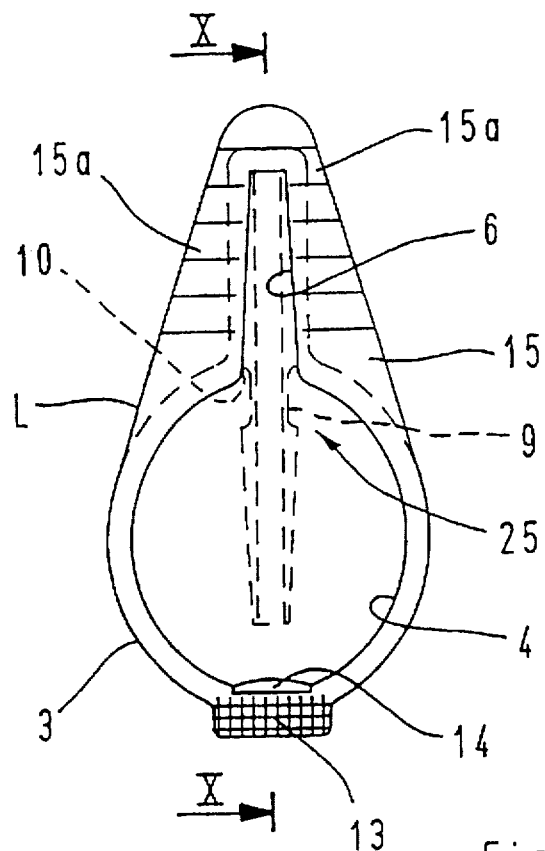
FIG. 9 is a front view of a confection package according to a preferred embodiment in which the handle may be used as a straw.
Figure 10:
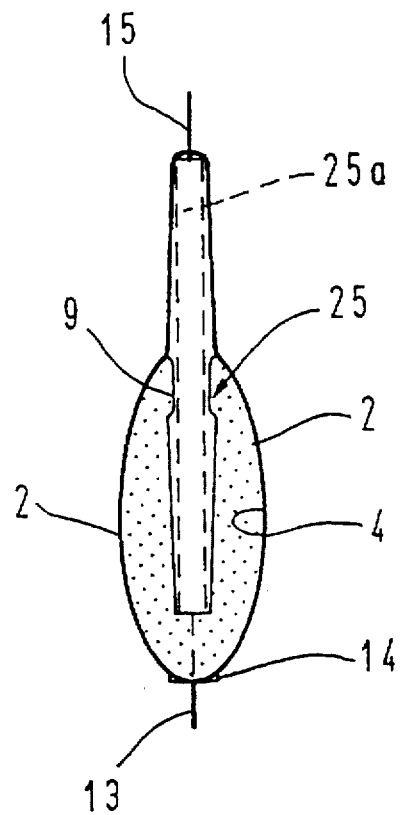
FIG. 10 is a section taken on the line X—X of FIG. 9.

The tubular member 25 may extend only partially into the pouch-like portion 2, as shown in FIGS. 9, 10 and 11, or even to the complete axial length of it, as shown in FIG. 12: in the first case the tubular member can be pushed down the inverted pouch-like portion by the consumer when drinking, for improving the stability of the straw, as shown in FIG. 11 and for totally drinking the product; in the latter case, the tubular member 25 is in a fixed axial position and the internal passage 25a may communicate with the product through lateral openings 25b. As shown in FIG. 4, when the tubular member 25 extends along the whole axial length of the confection package 2, the tubular member should preferably be inserted in a non-axial position, in order to allow pouring or injecting the product through the opening A at a location beside the member 25.

As shown in FIG. 12, one of the shells may be provided with a depression 26, forming a projection into the interior of the pouch-like portion and decreasing the volume available for the liquid. The depression acts as an expansion compensator when liquid product solidifies after pouring or injection, in order to avoid the risk that the pair of shells are separated when the liquid solidifies. In fact, if the liquid product expands during solidification (this happens with aqueous syrups) the depression 26 expands permanently as indicated in dashed line 26a and the outer shape of the pair of shells assumes a symmetrical condition.

In order to obtain a symmetrical configuration of the confection unit when the product is solidified, one or both shells may be provided with a plurality of symmetrical depressions, symmetrically disposed.

We claim:

1. A method of packaging an edible product comprising:
   forming a confection package comprising a pouch-like portion and a tubular portion whereof the interior communicates with the interior of the pouch-like portion;
   inserting a handle into said tubular portion after the forming of said package, so that said handle extends along said tubular portion and thence into said pouch-like portion;
   substantially filling the pouch-like portion with an edible fluid through an opening of said confection package; and
   sealing said opening.

2. A method according to claim 1, wherein an opening means for use in opening said package is formed in the confection package when forming said pouch-like portion and said tubular portion.

3. A method according to claim 1, wherein the pouch-like portion and the tubular portion are formed by blow-moulding.

4. A method according to claim 1, wherein the confection package is formed by joining together a pair of opposing shells.

5. A method according to claim 4, wherein the opposing shells are detachably sealed together along an edge that defines the profile of the product.

6. A method according to claim 5, wherein the pouch-like portion and the tubular portion are formed by blow-moulding and said opposing shells are moulded in a heated die with injection of compressed medium through said opening.

7. A confection unit comprising a confection package comprised of a pouch-like portion having an edge around said pouch-like portion and also having an interior, and a tubular portion having an interior which communicates with the interior of the pouch-like portion, with a handle extending along the tubular portion and thence into the pouch-like portion, an edible product in said pouch-like portion, said pouch-like portion having upper sealing at its upper end, and said tubular portion being bounded by lower sealing, said pouch-like portion and said tubular portion together being constituted by a pair of opposing shells, said upper sealing and said lower sealing being part of substantially continuous sealing having an outline around the edge of the pouch-like portion and the tubular portion, and the opposing shells being detachably sealed together along said edge.

8. A confection unit according to claim 7, and further comprising opening means arranged to allow separation of the shells along said edge.

9. A confection unit according to claim 8, wherein said opening means comprises a flap included in one of said shells and outside the outline of said substantially continuous sealing.

10. A confection unit according to claim 9, wherein said tubular portion is narrower than said pouch-like portion, whereby an indent is present between a boundary of said pouch-like portion and a boundary of said tubular portion, said flap being located in said indent.

11. A confection unit according to claim 10, wherein said flap is arranged to have an edge that defines a line substantially tangential to the outline of the pouch-like portion and converging towards the outer end of the tubular portion.

12. A confection unit according to claim 9, wherein said flap is provided with lines of weakness.

13. A confection unit according to claim 7, wherein said handle is tubular and open at its lower end and communicates with the product in order to be used as a straw.

14. A confection unit according to claim 13, wherein said handle communicates with the product by way of lateral openings in said handle.

15. A confection unit comprising a confection package comprised of a pouch-like portion having an edge around said pouch-like portion and also having an interior, and a tubular portion having an interior which communicates with the interior of the pouch-like portion, with a handle extending along the tubular portion and thence into the pouch-like portion, an edible product in said pouch-like portion, said pouch-like portion having upper sealing at its upper end, and said tubular portion being bounded by lower sealing, said pouch-like portion and said tubular portion together being constituted by a pair of opposing shells, said upper sealing and said lower sealing being part of substantially continuous sealing having an outline around the edge of the pouch-like portion and the tubular portion, and said handle having a downwardly tapering, outer peripheral, annular sealing surface which serves to prevent leakage of the product from the pouch-like portion into the tubular portion.

16. A confection unit according to claim 15, wherein said sealing surface extends along a substantial part of said tubular portion.

17. A confection unit according to claim 15, wherein said sealing surface comprises an annular peripheral surface of a seal ring at an intermediate part of said handle.

18. A confection unit comprising a confection package comprised of a pouch-like portion having an edge around said pouch-like portion and also having an interior, and a tubular portion having an interior which communicates with the interior of the pouch-like portion, with a handle extending along the tubular portion and thence into the pouch-like portion, an edible product in said pouch-like portion, said pouch-like portion having upper sealing at its upper end, and said tubular portion being bounded by lower sealing, said pouch-like portion and said tubular portion together being constituted by a pair of opposing shells, said upper sealing and said lower sealing being part of substantially continuous sealing having an outline around the edge of the pouch-like portion and the tubular portion and said handle having an intermediate portion formed with a peripheral groove.

19. A confection unit comprising a confection pack age comprised of a pouch-like portion having an edge around said pouch-like portion and also having an interior, and a tubular portion having an interior which communicates with the interior of the pouch-like portion, with a handle extending along the tubular portion and thence into the pouch-like portion, an edible product in said pouch-like portion, said pouch-like portion having upper sealing at its upper end, and said tubular portion being bounded by lower sealing, said pouch-like portion and said tubular portion together being constituted by a pair of opposing shells, said upper sealing and said lower sealing being part of substantially continuous sealing having an outline around the edge of the pouch-like portion and the tubular portion, and the portion of the handle projecting into said pouch-like portion being provided with indentations receiving portions of the product.

20. A confection unit comprising a confection package comprised of a pouch-like portion having an edge around said pouch-like portion and also having an interior, and a tubular portion having an interior which communicates with the interior of the pouch-like portion, with a handle extending along the tubular portion and thence into the pouch-like portion, an edible product in said pouch-like portion, said pouch-like portion having upper sealing at its upper end, and said tubular portion being bounded by lower sealing, said pouch-like portion and said tubular portion together being constituted by a pair of opposing shells, said upper sealing and said lower sealing being part of substantially continuous sealing having an outline around the edge of the pouch-like portion and the tubular portion, and one of said shells being provided with a depression forming a flexible projection into the interior of said pouch-like portion.

* * * * *